United States Patent
Felton et al.

(10) Patent No.: US 9,456,061 B2
(45) Date of Patent: Sep. 27, 2016

(54) CUSTOM ERROR PAGE ENABLED VIA NETWORKED COMPUTING SERVICE

(75) Inventors: Mitchell D. Felton, Rochester, MN (US); Brian E. Olson, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 235 days.

(21) Appl. No.: 13/586,246

(22) Filed: Aug. 15, 2012

(65) Prior Publication Data

US 2014/0052835 A1 Feb. 20, 2014

(51) Int. Cl.
*G06F 15/173* (2006.01)
*H04L 29/06* (2006.01)
*G06F 17/30* (2006.01)
*H04L 29/08* (2006.01)

(52) U.S. Cl.
CPC .......... *H04L 69/24* (2013.01); *G06F 17/3089* (2013.01); *H04L 67/02* (2013.01); *H04L 67/10* (2013.01); *H04L 67/1002* (2013.01)

(58) Field of Classification Search
CPC ..... H04L 67/32; H04L 67/322; H04L 67/02; H04L 67/28; H04L 67/2819; H04L 67/1008
USPC ....................................................... 709/223
See application file for complete search history.

(56) References Cited

U.S. PATENT DOCUMENTS

| 6,117,188 | A  | * | 9/2000  | Aronberg et al. | 717/176 |
|-----------|----|---|---------|-----------------|---------|
| 7,606,900 | B2 | * | 10/2009 | Martin et al. | 709/225 |
| 7,752,629 | B2 |   | 7/2010  | Revanuru et al. | |
| 8,392,578 | B1 | * | 3/2013  | Donovan et al. | 709/227 |
| 2002/0059436 | A1 | * | 5/2002 | Kubo | 709/229 |
| 2004/0088394 | A1 | * | 5/2004 | Brinton et al. | 709/223 |
| 2006/0221925 | A1 | * | 10/2006 | Beathard | 370/342 |
| 2007/0130313 | A1 | * | 6/2007 | King | 709/223 |
| 2009/0138858 | A1 | * | 5/2009 | Livshits et al. | 717/130 |
| 2010/0040222 | A1 | * | 2/2010 | Anderson et al. | 379/266.01 |
| 2010/0281311 | A1 |   | 11/2010 | Gao et al. | |
| 2012/0030326 | A1 |   | 2/2012  | Cassidy et al. | |
| 2012/0226794 | A1 | * | 9/2012  | Calder et al. | 709/223 |
| 2014/0369218 | A1 | * | 12/2014 | Ionta et al. | 370/252 |

OTHER PUBLICATIONS

> Amazon Web Services; < . How AWS Pricing Works. Amazon Web Services [> database < online], [retrieved on Mar. 27, 2014]. Retrieved from the Internet <URL: > https://d36cz9buwru1tt.cloudfront.net/AWS_Pricing_Overview.pdf <.*

(Continued)

*Primary Examiner* — Tauqir Hussain
*Assistant Examiner* — Austin Moreau
(74) *Attorney, Agent, or Firm* — Lisa Ulrich; Andrew M. Calderon; Roberts Mlotkowski Safran Cole & Calderon, P.C.

(57) ABSTRACT

An approach is provided for queuing clients when a web page is temporarily unavailable. The approach includes providing a computer infrastructure operable to: maintain a queue of clients requesting the web page; receive an indication of an availability number from a host of the web page; and release one or more of the clients from the queue equal to the availability number indicated by the host, based on the receiving the indication of the availability number.

22 Claims, 6 Drawing Sheets

(56) References Cited

OTHER PUBLICATIONS

> Amazon Web Services; < . How AWS Pricing Works. Amazon Web Services [ > database < online], [retrieved on Mar. 27, 2014]. Retrieved from the Internet <URL: > https://d36cz9buwru1tt.cloudfront.net/AWS_Pricing_Overview.pdf <.*

> 404 Error Pages; <. Welcome to 404 Error Pages .com. [ > database online], [retrieved on Mar. 27, 2015]. Retrieved from the Internet <URL: > https://web.archive.org/web/20110603171942/http://www.404errorpages.com/ <.*

"Technology & Integration." Queue-it. Jul. 2, 2012. Web. Aug. 14, 2015. <https://web.archive.org/web/20120702000625/http://www.queue-it.com/technology-integration>.*

"Retail." Queue-it. Jul. 2, 2012. Web. Aug. 14, 2015. <https://web.archive.org/web/20120702030446/http://www.queue-it.com/retail>.*

"Customers." Queue-it. Jul. 27, 2012. Web. Aug. 14, 2015. <https://web.archive.org/web/20120727033150/http://www.queue-it.com/customers>.*

"FAQ's—High Load Event." Computicket. Jul. 11, 2012. Web. Aug. 14, 2015. <https://web.archive.org/web/20120711033116/http://online.computicket.com/web/faq/40>.*

Ley Valentin, Camilla. "IRX2012—Innovation Pavilion." YouTube. Queue-it, Apr. 11, 2012. Web. Aug. 14, 2015. <https://www.youtube.com/watch?v=UAg0-2pTN_Q>.*

Alcaraz, S. et al., "Promoting Web Traffic for a DiffServ Architecture", IEEE, 2007, 6 pages.

Mell, P., "The NIST Definition of Cloud Computing", National Institute of Standards of Technology, Information Technology Laboratory, Ver 15, Oct. 7, 2009, pp. 1-2.

* cited by examiner

CUSTOM ERROR PAGE ENABLED VIA NETWORKED COMPUTING SERVICE

TECHNICAL FIELD

The present invention generally relates to handling requests for web pages and, more particularly, to methods and systems for providing a custom error page when a host is temporarily unavailable.

BACKGROUND

Websites (e.g., Internet websites) that experience fast-paced growth and/or have a spike in user traffic sometimes fail to handle the amount of page requests submitted by browsers. Typical scenarios include, for example: a website that receives a prominent media mention that spikes traffic; a website that quickly gains popularity that increases traffic faster than infrastructure is upgraded; and a website that is running a popular sale and is overwhelmed by the number of customers. In all of these scenarios, the host's opportunity to capitalize on the increased traffic is lost when users are unable to access the website.

When a user points their web browser to a URL (uniform resource locator), i.e., requests a web page, they are either served up the page or given one of several predefined error pages describing what happened with their request. In the case where the hosting server is too busy or unable to currently fulfill the request, the user's browser may display an error page, e.g., "503 Error", "Service Temporarily Unavailable", "Service Unavailable", etc. The error page typically instructs the user to try again later, since the target web page is expected to be available later either when load decreases or when some other problem is fixed.

Upon receiving an error page, users typically try to reload the page several times either until the page comes up or they become tired of waiting, which causes additional load on the server hosting the target web page. This is not a very efficient solution for the user since they are spending time resubmitting their request. Moreover, if the user stops attempting to access the web page after receiving an error page, the website has lost site traffic and potential revenue, e.g., advertising, product sales, click revenue, etc.

SUMMARY

In a first aspect of the invention, there is a method of queuing clients when a web page is temporarily unavailable. The method includes providing a computer infrastructure operable to: maintain a queue of clients requesting the web page; receive an indication of an availability number from a host of the web page; and release one or more of the clients from the queue equal to the availability number indicated by the host, based on the receiving the indication of the availability number.

In another aspect of the invention, a system is implemented in hardware and includes a computer infrastructure operable to receive an indication from a client that a web page is temporarily unavailable. The computer infrastructure is further operable to add the client to a queue with a plurality of other clients waiting for the web page. The computer infrastructure is also operable to send queue data to the client. The computer infrastructure is additionally operable to periodically receive calls from the client. The computer infrastructure is even further operable to provide updated queue data to the client based on the calls, wherein the queue data and the updated queue data include queue position and estimated wait time for the client.

In an additional aspect of the invention, a computer program product includes a computer usable storage medium having readable program code embodied in the storage medium. The computer program product includes at least one component operable to: receive a request for a web page from a client; determine a temporary inability to serve the web page to the client; and send an error page to the client. The error page includes a script that is configured to: automatically add the client to a queue associated with the web page; and automatically re-submit a request for the web page to the host upon the client being released from the queue.

In a further aspect of the invention, there is a method implemented in a computer infrastructure comprising a combination of hardware and software. The method includes: submitting a request for a web page to a host; receiving an error response from the host indicating that the web page is temporarily unavailable; and sending a request to a service to be included in a queue associated with the web page. The method also includes receiving queue data from the service; displaying a custom error page based on the queue data; and receiving a token from the service. The method further includes: submitting a second request for the web page to the host, wherein the second request includes the token; receiving the web page from the host based on the second request including the token; and displaying the web page.

In another aspect of the invention, a computer system for queuing clients when a web page of a host is temporarily unavailable includes a CPU, a computer readable memory and a computer readable storage media. The system includes first program instructions to receive an indication from a browser of a client that the web page is temporarily unavailable. The system includes second program instructions to add the client to a queue with a plurality of other clients waiting for the web page. The system includes third program instructions to provide queue data to the client, wherein the queue data includes queue position and estimated wait time for the client. The system includes fourth program instructions to receive an indication of availability to handle new page requests from the host of the web page. The system includes fifth program instructions to release the client from the queue based on the receiving the indication of availability. The first, second, third, fourth, and fifth program instructions are stored on the computer readable storage media for execution by the CPU via the computer readable memory. The releasing comprises providing a token to the client and deleting the client from the queue, the token being a data structure that indicates to the host that the client has been released from the queue.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
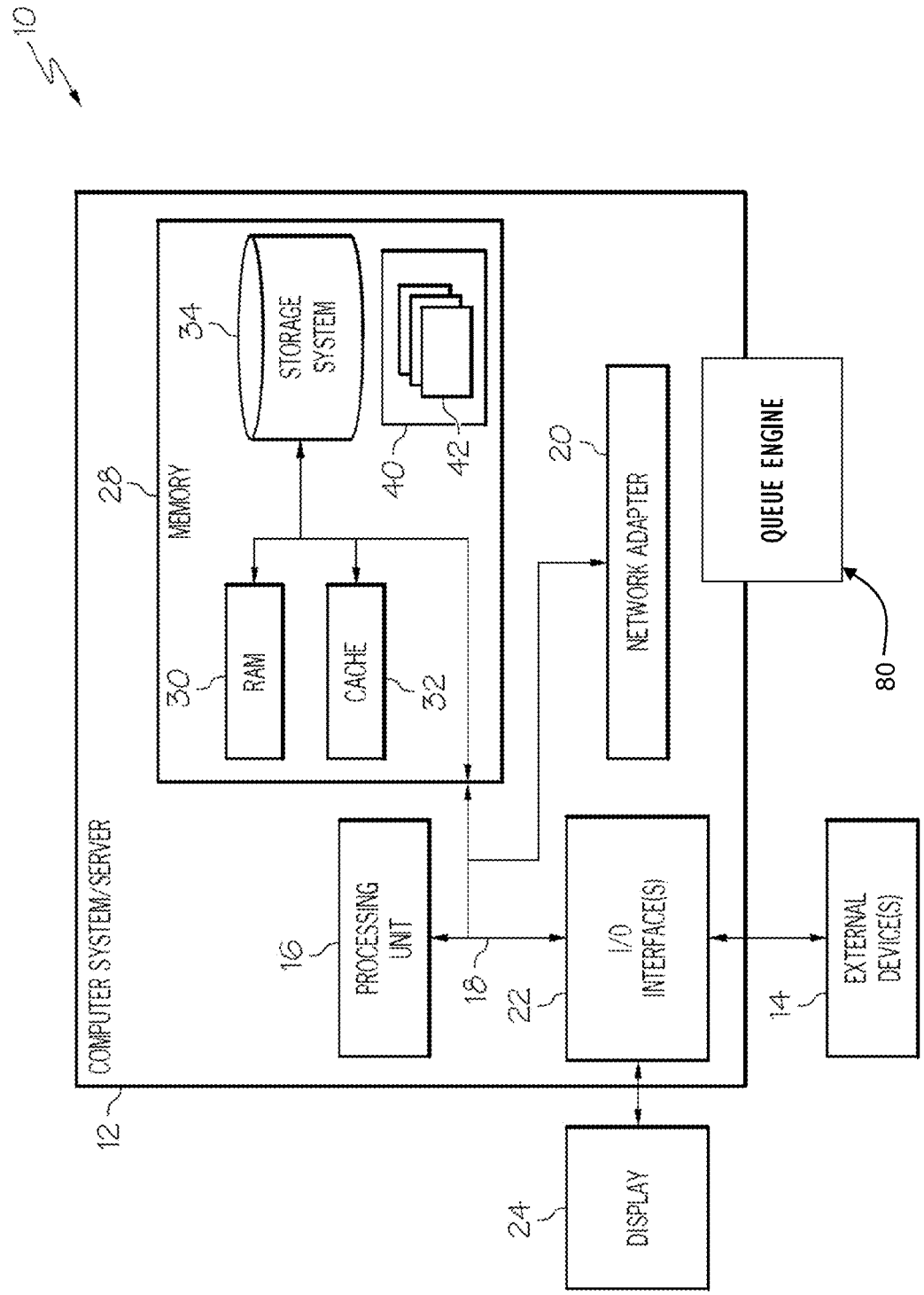
FIG. 1 depicts a cloud computing node according to an embodiment of the present invention.

The present invention generally relates to handling requests for web pages and, more particularly, to methods and systems for providing a custom error page when a host is temporarily unavailable. In accordance with aspects of the invention, a web site host returns a custom error page to a client browser when the host is temporarily unable to provide a target web page that was requested by the client browser. In embodiments, the custom error page contacts a service that maintains a queue of all client browsers that have received a custom error page from the particular host for the particular target web page. Each client browser may asynchronously poll the service to determine the status of its page request, e.g., place in the queue, expected wait time, etc. In embodiments, the host informs the service when the host is able to handle a number of new page requests, and the service releases that number of client browsers from the queue. Upon being released from the queue, each client browser automatically re-submits its page request to the host, and the host provides the target web page to the client browser. In this manner, implementations of the invention provide methods and systems for intelligently handling web page requests when a host is temporarily unavailable.

In embodiments, the service that maintains the queue and performs one or more of the functions described herein may be implemented in a cloud computing infrastructure, as described in greater detail herein. Additionally, the service may maintain the queue as a FIFO (first in first out) queue.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. FIG. 1 can also represent a computing infrastructure capable of performing and/or implementing tasks and/or functions of the methods described herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16. In embodiments, the computer system/server 12 comprises or communicates with a queue engine 80 as described in greater detail herein.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. For example, some or all of the functions of the queue engine 80 may be implemented as one or more of the program modules 42. Additionally, the queue engine 80 may be implemented as separate dedicated processors or a single or several processors to provide the functionality described herein. In embodiments, the queue engine 80 performs one or more of the processes described herein, including but not limited to: maintain a queue of clients (e.g., browsers) that have received a custom error page from a host (e.g., HTTP server) for a particular web page; provide queue data (e.g., position in the queue, estimated wait time, etc.) to each of the clients in the queue; receive polling from the clients and provide updated queue data based on the polling; receive an indication from the host to release one or more clients from the queue; and provide a token to the one or more clients at the top of the queue based on receiving the indication from the host.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID (redundant array of inexpensive disks or redundant array of independent disks) systems, tape drives, and data archival storage systems, etc.

Figure 2:
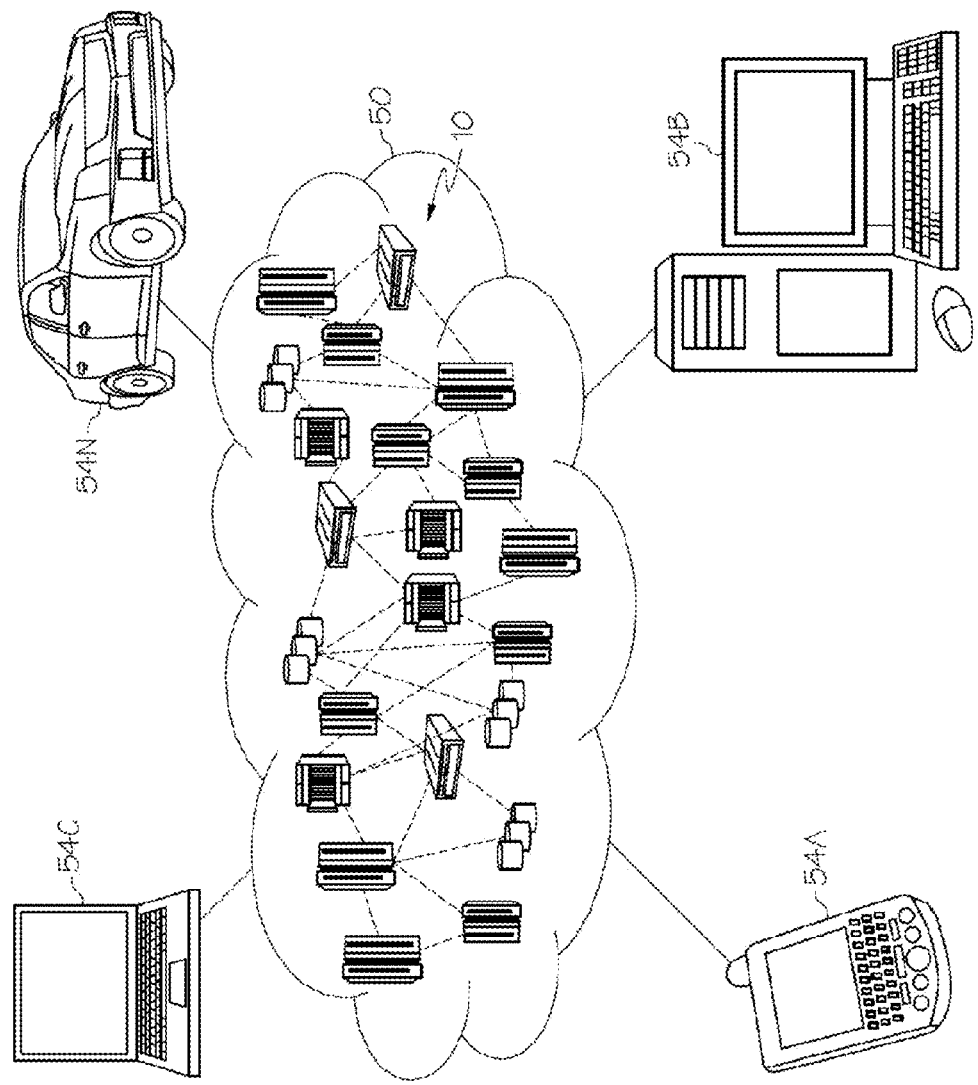
FIG. 2 depicts a cloud computing environment according to embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
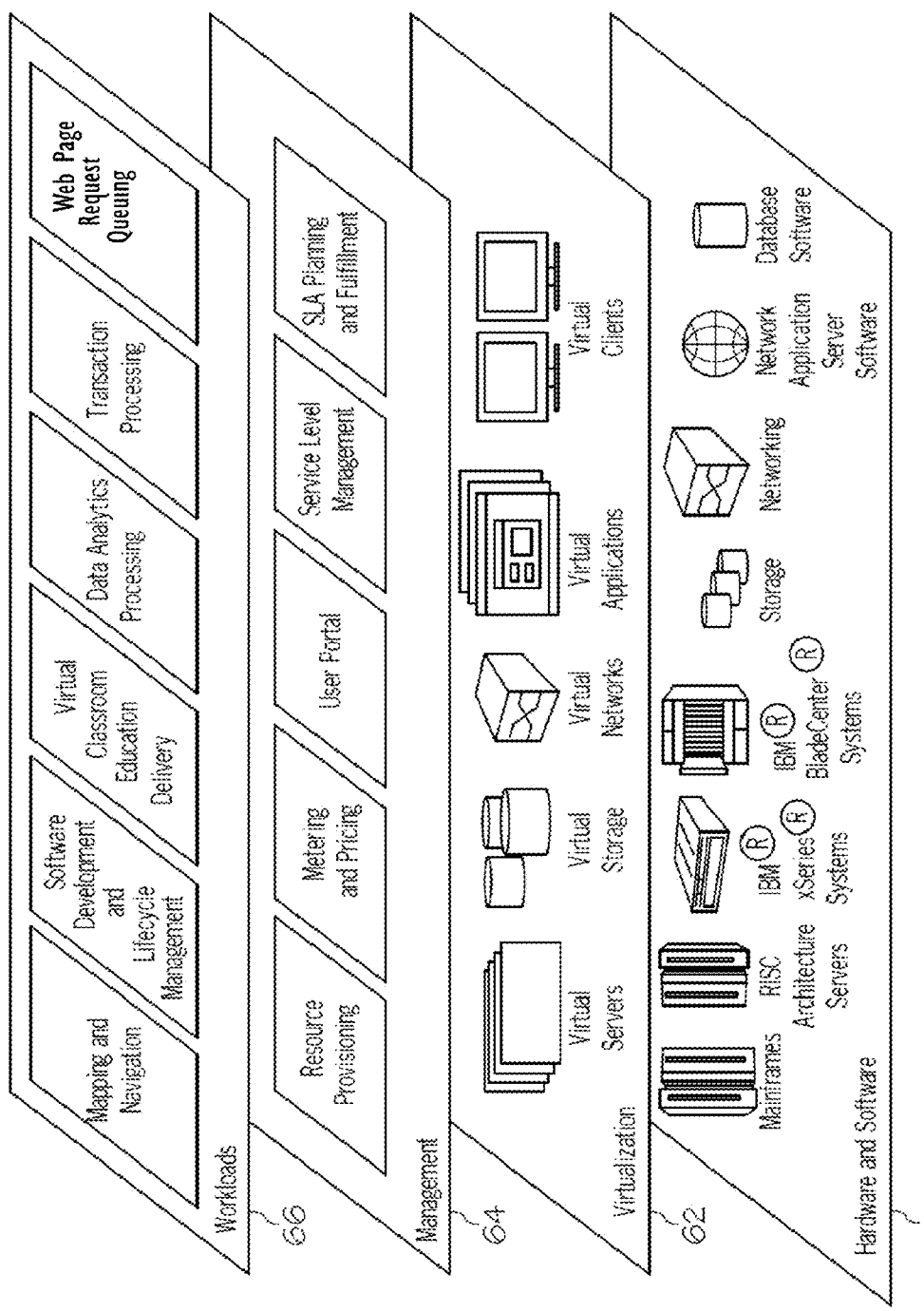
FIG. 3 depicts abstraction model layers according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and web page request queuing. In accordance with aspects of the invention, the web page request queuing workload/function operates to perform one or more of the processes of the queue engine 80 described herein, including but not limited to: maintain a queue of clients (e.g., browsers) that have received a custom error page from a host (e.g., HTTP server) for a particular web page; provide queue data (e.g., position in the queue, estimated wait time, etc.) to each of the clients in the queue; receive polling from the clients and provide updated queue data based on the polling; receive an indication from the host to release one or more clients from the queue; and provide a token to the one or more clients at the top of the queue based on receiving the indication from the host.

As will be appreciated by one skilled in the art, aspects of the present invention, including the queue engine 80 and the functionality provided therein, may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Block Diagram and Exemplary Operation

Figure 4:
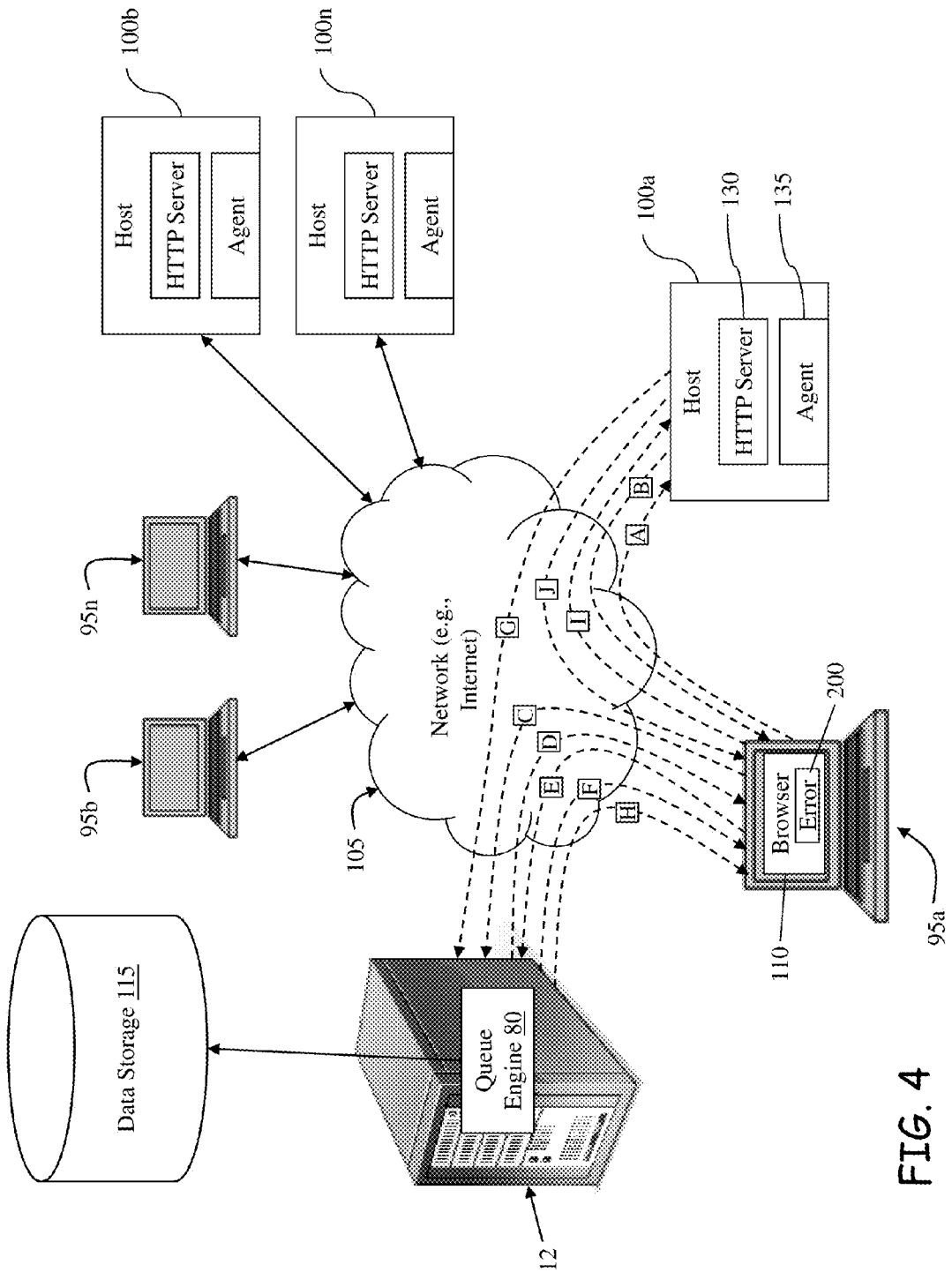
FIG. 4 depicts a queuing block diagram in accordance with aspects of the invention.

FIG. 4 depicts a queuing block diagram in accordance with aspects of the invention. In embodiments, any number of clients 95a, 95b, . . . , 95n can communicate with any number of hosts 100a, 100b, . . . , 100n via a network 105, e.g., via the Internet. Each client 95a, 95b, . . . , 95n may be similar to the local computing devices 54A-N depicted in FIG. 2, and may comprise a browser 110, e.g., a software application for retrieving, presenting, and traversing information resources on the World Wide Web. Moreover, each host 100a, 100b, . . . , 100n may comprise an HTTP server (Hypertext Transfer Protocol server), or other web server, configured to deliver one or more web pages upon request to any number of clients 95a, 95b, . . . , 95n via the network 105 (e.g., the Internet).

Still referring to FIG. 4, in accordance with aspects of the invention, a computer system/server 12 runs or communicates with a queue engine 80 (e.g., as described with respect to FIG. 1). The computer system/server 12 and queue engine 80 may be associated with a node in the cloud (e.g., node 10 as depicted in FIGS. 1 and 2), and may communicate with the clients 95a, 95b, . . . , 95n and the hosts 100a, 100b, . . . , 100n via the network 105. The queue engine 80 may store data associated with one or more queues at a physical data storage device 115, which may comprise, for example, a storage node in the cloud as depicted in FIG. 2.

As depicted at step "A" in FIG. 4, a client 95a may use a browser 110 to send an HTTP request (e.g., a request for a web page) to a target host 100a via the network 105. This initial HTTP request may be performed in any suitable conventional manner. In the event the host 100a is available for handling the HTTP request from the client 95a, the HTTP server 130 of the host 100a delivers the requested web page to the client 95a via the network 105, e.g., in a conventional manner. On the other hand, when the host 100a is temporarily not available for handling the HTTP request from the client 95a, the HTTP server 130 of the host 100a delivers an error response to the client 95a via the network 105, as depicted at step "B" in FIG. 4. The host 100a may be temporarily not available to handle the request for any reason, including it being overloaded by too many requests from clients or down for maintenance, e.g., as with a 503 error situation.

In accordance with aspects of the invention, an agent 135 associated with the host 100a detects when the host 100a is temporarily unavailable for handling new page requests from clients. For example, the agent 135 may detect that the HTTP server 130 of the host 100a has no processing threads available for handling new page requests. In this situation, the agent 135 causes the host 100a to switch to a token-based operating mode in which the HTTP server 130 only handles HTTP requests that include a token as described in greater detail herein. The agent 135 may comprise, for example, a plug-in to the HTTP server 130.

In embodiments, the error response at step "B" comprises a custom error page that has an embedded script. At step "C", the script causes the browser 110 to automatically contact the queue engine 80 and request inclusion in a queue associated with the web page that is the subject of the initial HTTP request (e.g., the web page requested at step "A"). The request at step "C" may include, for example, data identifying the client 95a, data identifying the target web page and/or host 100a, an indication that the web page is temporarily unavailable, and a timestamp (e.g., associated with the HTTP request at step "A" and/or the error response at step B). As used herein, automatically contacting the queue engine means that it is not necessary for the user of the client 95a to provide input to initiate the contacting. Embodiments of the invention may be implemented with an opt-out procedure, where the browser prompts the user for permission to contact the queue engine and only contacts the queue engine for inclusion in the queue upon receiving permission from the user.

At step "D", the queue engine 80 transmits queue data back to the browser 110 as a result of the request for inclusion in the queue (e.g., the request from step "C"). The queue data may include, for example, a unique identifier for this client 95a for this HTTP request, a position in the queue, and an estimated wait time in the queue. In embodiments, the browser 110 displays a custom error page 200 at the client 95a based on the queue data as described in greater detail herein with respect to FIG. 5.

In embodiments, the queue engine 80 maintains data that defines an order of respective clients (e.g., clients 95a, 95b, . . . , 95n) in a particular queue for a particular web page associated with a particular host 100a. For example, there may be tens, hundreds, or even thousands of clients simultaneously requesting a web page from a single host 100a. In embodiments, when the agent 135 redirects clients to the queue engine 80 based on determining that the host 100a is temporarily unavailable, the queue engine 80 maintains an ordered FIFO (first in first out) queue of the respective clients based on the timestamps.

Still referring to FIG. 4, at step "E", the script in the custom error page periodically causes the browser 110 to asynchronously call/poll the queue engine 80 to get updated queue data, e.g., an updated position in the queue, an updated estimated wait time in the queue, etc. At step "F", the queue engine 80 transmits the updated queue data back to the browser 110, which updates and displays the custom error page 200 at the client 95a based on the updated queue data. In embodiments, the queue engine 80 is configured to determine and provide unique queue data for each client in the queue.

According to aspects of the invention, at step "G", the agent 135 determines that the host 100a is capable of handling "n" number of new requests for the web page, and the agent 135 communicates this number "n" to the queue engine 80. For example, the agent 135 may detect "n" number of threads are (e.g., have become) available to process new requests at the HTTP server 130 in the host 100a, and instruct the queue engine 80 to release the next "n" clients from the queue associated with this web page. The number "n" may be referred to as an availability number indicated by the host 100a.

At step "H", the queue engine 80 transmits a token to the next "n" number of clients (e.g., client 95a) at the top of the FIFO queue associated with the particular web page from step "G". The transmission of tokens at step "H" may be performed in a push or pull manner. For example, in a push scenario where client 95a is one of the next "n" number of clients at the top of the FIFO queue, the queue engine 80 may transmit the token to client 95a without waiting for client 95a to initiate another asynchronous call (e.g., the asynchronous call as performed at step "E").

In a pull scenario, the queue engine 80 waits until one or more of the next "n" number of clients at the top of the FIFO queue makes another asynchronous call, e.g., as at step "E", and transmits the token to the client after and as a result of receiving the asynchronous call. For example, in the pull scenario where client 95a is one of the next "n" number of clients at the top of the FIFO queue, the queue engine 80 waits until client 95a makes another asynchronous call, e.g., as at step "E", and transmits the token to the client 95a as a result of receiving the asynchronous call. In this manner, the queue engine 80 may provide a token to each of the next "n" number of clients at the top of the FIFO queue.

Upon sending a token to the client 95a, the queue engine 80 deletes the client 95a from the queue and adjusts the position of the remaining clients in the queue according to the deletion (e.g., moving remaining clients up in the queue). In embodiments, the token is any suitable data structure that identifies the client 95a as having been released from the queue by the queue engine 80. For example, the token may comprise a data structure that directs the host to handle a page request with the token ahead of a page request without the token.

Upon receiving the token at step "H", the script causes the browser 110 to automatically re-submit the HTTP request and the token to the host 100a at step "I". Upon receiving the re-submitted HTTP request with the token at step "I", the host 100a processes the HTTP request and delivers the requested web page to the client 95a at step "J".

In accordance with aspects of the invention, the host 100a only handles HTTP requests that include a token when the agent 135 has switched the host 100a to token-based operating mode. In this manner, the host 100a enforces the ordering implemented by the queue at the queue engine 80, and does not serve new HTTP requests (e.g., from other client not in the queue) ahead of those that have been waiting in the queue. When the number of clients in the queue maintained by the queue engine 80 reaches zero, the agent 135 switches the host 100a to normal (e.g., non-token-based) operating mode in which page requests without tokens are handled by the HTTP server 130 in a conventional manner.

In embodiments, the queue engine 80 deletes a client from the queue when the client browser fails to send a predetermined number of asynchronously calls for updated queue data, e.g., as at step "E". For example, when a user of the client 95a closes the browser (or browser tab) containing the custom error page or navigates the browser away from the custom error page, the script no longer causes the browser 110 to asynchronously call the queue engine. The queue engine may be configured to expect a new asynchronous call from each browser at a predetermined time interval. When the queue engine 80 determines that the browser in no longer making the expected asynchronous call, the queue engine 80 may delete that client from the queue and adjust the position of other clients in the queue according to the deletion.

Still referring to FIG. 4, in additional embodiments, the agent 135 may be configured (e.g., via appropriate programming) to monitor performance data of the host 100a and provide this performance data to the queue agent 80 for determining expected wait times in the queue. For example, the agent 135 may determine an average response time for the host 100a to handle a page request during non-peak times, e.g., when the host 100a is not overloaded. The queue engine 80 may use this average response time in association with each client's position in the queue to calculate a respective estimated wait time for each client in the queue.

Although the queue engine 80 is described in the example of FIG. 4 with respect to a single client 95a and a single host 100a, it is understood that the queue engine 80 is configured to queue any number of clients (e.g., 95a-n) for any particular web page hosted by a host 100a. Moreover, the queue engine 80 may be configured to simultaneously maintain and manage plural different queues for plural different websites from any number of hosts 100a-n, with any number of clients in each of the queues.

Figure 5:
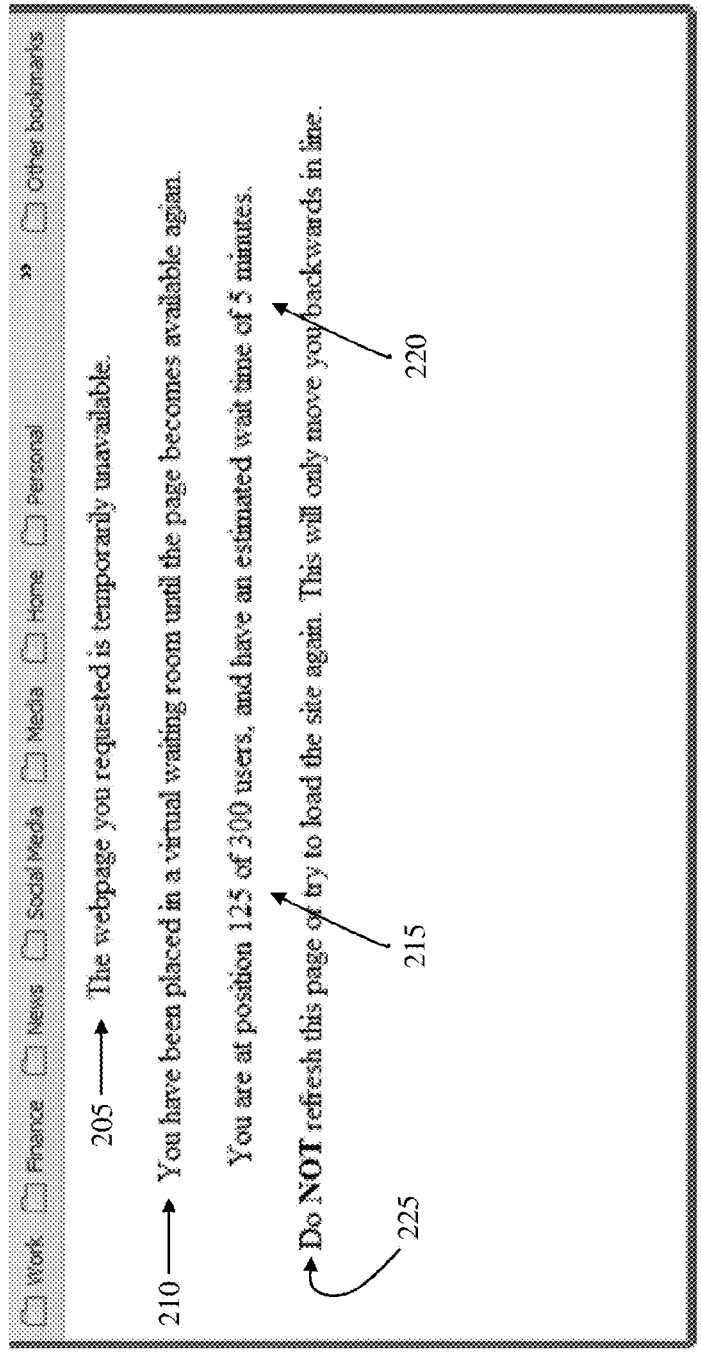
FIG. 5 shows an exemplary custom error page in accordance with aspects of the invention.

FIG. 5 shows an exemplary custom error page 200 in accordance with aspects of the invention. The custom error page 200 may be displayed by the browser (e.g., browser 110) of a user computing device (e.g., client 95a). In embodiments, the custom error page 200 may include at least one of: first data 205 indicating that the requested web page is temporarily unavailable; second data 210 informing the user that they have been placed in a queue or virtual waiting room; third data 215 indicating the user's position in the queue; fourth data 220 indicating the user's estimated wait time in the queue; and fifth data 225 informing the user not to refresh the page of resend the HTTP request. The third data 215 indicating the user's position in the queue, and the fourth data 220 indicating the user's estimated wait time in the queue, may be periodically updated by the queue engine (e.g., queue engine 80) during periodic asynchronous calls (e.g., as at step "E" of FIG. 4). It is also contemplated that the data may be customized for the client.

Flow Diagrams

Figure 6:
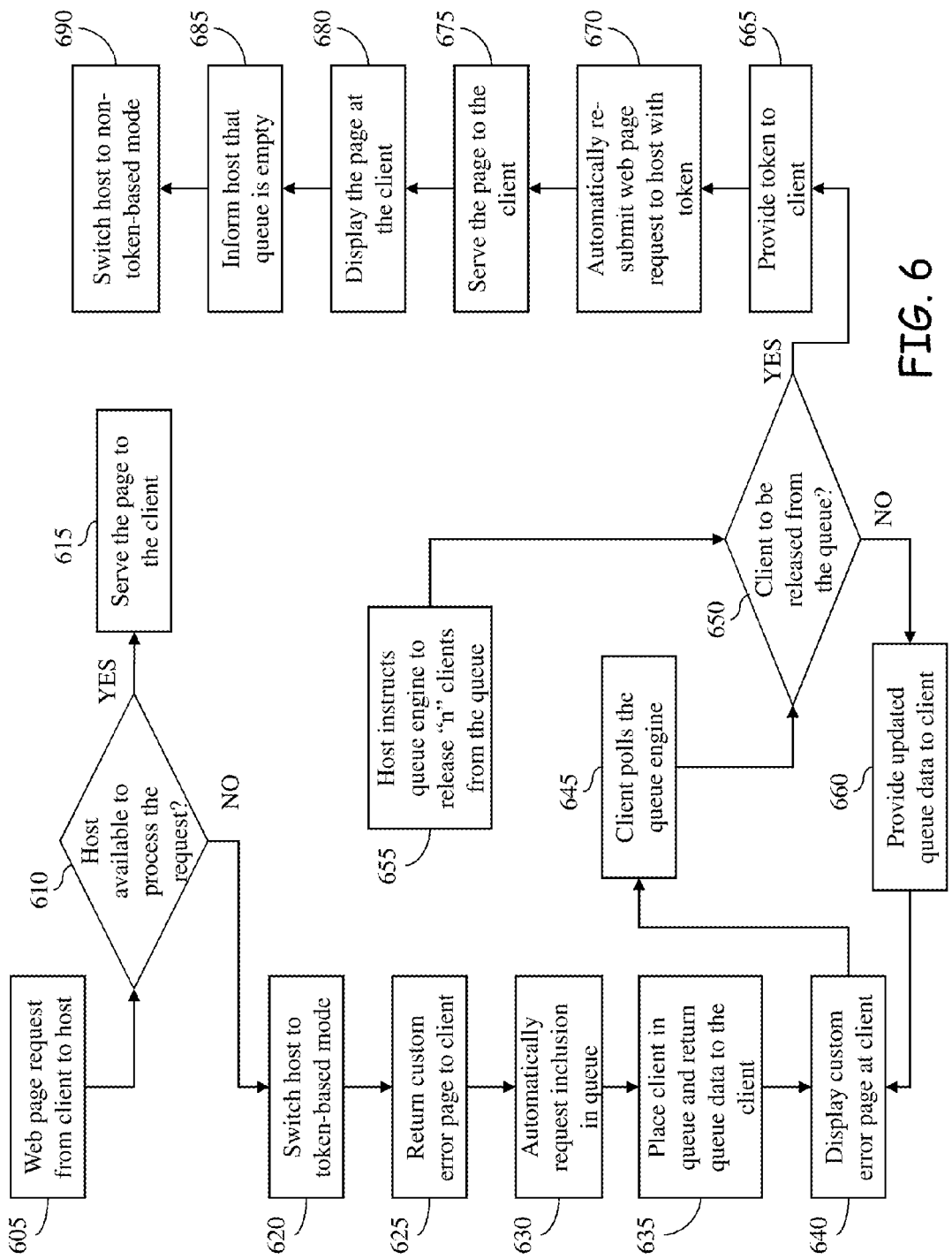
FIG. 6 depicts an exemplary flow diagram in accordance with aspects of the invention.

FIG. 6 shows an exemplary flow for performing aspects of the present invention. The steps of FIG. 6 may be implemented in any of the environments of FIGS. 1-5, for example.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIGS. 1-5. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 6 depicts an exemplary flow depicting aspects of processes in accordance with aspects of the present invention. At step 605, a client computing device (e.g., client 95a) sends an HTTP request (e.g., web page request) to a web server (e.g. host 100a) via a network (e.g., network 105). Step 605 may be performed in a manner similar to step "A" described above.

At step 610, the host determines whether it is available to handle the HTTP request from step 605. In embodiments, an agent (e.g., agent 135) determines the availability based on a number of available threads in an HTTP server (e.g., HTTP server 130) of the host. In the event the HTTP server of the host is available, then at step 615 the host serves the requested web page to the client. On the other hand, when the HTTP server of the host is temporarily not available, then at step 620 the agent switches the HTTP server to token-based operating mode, and at step 625 the HTTP server returns an error page to the client. Step 625 may be performed in a manner similar to step "B" described above. From the perspective of the host, steps 605, 610, and 625 constitute receiving a request for a web page from a client, determining a temporary inability to serve the web page to the client, and sending an error page to the client.

At step 630, a script embedded in the error page causes the client browser to automatically contact a queue engine (e.g., queue engine 80), indicating that the web page is temporarily unavailable, and requesting inclusion in a queue associated with the web page that is the target of the HTTP request of step 605. Step 630 may be performed in a manner similar to step "C" described above.

At step 635, the queue engine places the client in a queue (e.g., a FIFO queue) associated with the web page that is the target of the HTTP request of step 605, and returns queue data to the client. The queue data may include, for example, the client's position in the queue and an estimated wait time. Step 635 may be performed in a manner similar to step "D" described above. At step 640, the client browser displays a custom error page on the client computer device. The custom error page may be similar to that shown in FIG. 5.

At step 645, the client browser asynchronously calls (e.g., polls) the queue engine for updated queue data. Step 645 may be performed in a manner similar to step "E" described above. At step 650, the queue engine determines whether the client is to be released from the queue, e.g., by determining whet the client position in the queue is within a number "n" indicated by the host. In embodiments, the next "n" number of clients is indicated by the host at step 655. The indication of availability at step 655 can occur at any time during the process, and may be performed in a manner similar to step "G" described above.

When it is determined at step 650 that the client is not within the next "n" number of clients to be released, or when "n" equals zero, then at step 660 the queue engine provides updated queue data to the client. The client's custom error page is updated at step 640 based on the updated queue data. Step 660 may be performed in a manner similar to step "F" described above.

On the other hand, when the client is determined at step 650 to be within the next "n" number of clients to be released, then at step 665 the queue engine provides a token to the client. Step 665 may be performed in a manner similar to step "H" described above.

At step 670, the script causes the client browser to automatically resubmit the HTTP request, including the token, to the host. Step 670 may be performed in a manner similar to step "I" described above.

At step 675, the HTTP server of the host processes the request from step 670, e.g., by serving the requested web page to the client. Step 675 may be performed in a manner similar to step "J" described above. At step 680, the client browser displays the web page that was provided by the host at step 675.

In further embodiments, at step 685 the queue engine eventually informs the host that the queue for the particular website is empty (e.g., no clients remain in the queue). Then, at step 690, the agent may switch the host to normal (non-token-based) operating mode.

In embodiments, a service provider, such as a Solution Integrator, could offer to perform the processes described herein, e.g., the processes performed by the queue engine 80, among other processes. In this case, the service provider can create, maintain, deploy, support, etc., the computer infrastructure that performs the process steps of the invention for one or more customers. These customers may be, for example, any business that uses technology and provides or utilizes services. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method of queuing clients when a web page is temporarily unavailable, comprising:
   maintaining, by a computer processor of a queue server, a queue of clients requesting the web page when:
      the host has been determined to be temporarily unable to serve the web page to the clients, and
      the host has switched from a non-token-based operating mode in which an HTTP server handles requests for the web page without tokens to a token-based operating mode in which the HTTP server only handles requests for the web page that include the tokens;
   receiving, by the processor, an asynchronous call from one of the clients in the queue to get updated queue data;
   receiving, by the processor, an indication of an availability number from a host of the web page, wherein the availability number is a number "n" that indicates a number of threads available at the host to process new requests for the web page; and
   based on the receiving the availability number from the host:
      transmitting, by the processor, the tokens to "n" number of the clients at the top of the queue, the tokens identifying the "n" number of the clients as having been released from the queue, wherein the transmitting is performed in a pull manner after and as a result of receiving another asynchronous call from the one of the clients; and
      deleting, by the processor, the "n" number of the clients from the queue.

2. The method of claim 1, wherein the token comprises a data structure that directs the host to handle a page request with the token ahead of a page request without the token.

3. The method of claim 1, wherein the queue is a first in first out queue.

4. The method of claim 1, further comprising receiving a request from each one of the clients to be included in the queue.

5. The method of claim 4, wherein the request from each one of the clients is received from a browser of each one of the clients.

6. The method of claim 4, further comprising sending updated queue data to the at least one of the clients based on the receiving the call.

7. The method of claim 6, wherein the updated queue data comprises a position in the queue and an estimated wait time, both associated with the at least one of the clients.

8. The method of claim 7, further comprising determining the estimated wait time based on statistics associated with the host.

9. The method of claim 8, wherein the estimated wait time is based on an average response time for the host to handle a page request for the web page during non-peak times.

10. The method of claim 9, further comprising:
    determining that a non-calling client in the queue has not made an asynchronous call at an expected predetermined time interval; and
    based on the determining, deleting the non-calling client from the queue and adjusting positions of other clients in the queue according to the deleting the non-calling client.

11. The method of claim 1, wherein the maintaining, the receiving, and the releasing are performed by a queue engine running at a node in a cloud environment.

12. The method of claim 1, wherein a service provider at least one of creates, maintains, deploys and supports the computer infrastructure.

13. The method of claim 1, wherein steps of claim 1 are provided by a service provider on a subscription, advertising, and/or fee basis.

14. The method of claim 1, wherein:
    the queue server simultaneously maintains and manages a plural different queues for plural different websites of plural different hosts;
    the web page is one of the plural different websites; and
    the queue is one of the plural different queues.

15. A system implemented in hardware and comprising a computer infrastructure operable to:
    receive an indication from a client that a web page at a host is temporarily unavailable, wherein the indication includes data identifying the web page, host, and a timestamp associated with a request for the web page;
    switch from a non-token-based operating mode in which an HTTP server handles requests for the web page without tokens to a token-based operating mode in which the HTTP server only handles requests for the web page that include the tokens;
    add the client to a queue with a plurality of other clients waiting for the web page;
    send queue data to the client, the queue data comprising: a unique identifier for the client related to the request, a position in the queue, data informing a user not to refresh the request for the web page, and an estimate wait time in the queue;
    periodically receive calls from the client, wherein the calls comprise an asynchronous call to obtain an updated position in the queue, and an updated estimated wait time;

provide updated queue data to the client based on the calls, wherein the queue data and the updated queue data include queue position and estimated wait time for the client;
receive a communication from the host indicating that "n" threads are available to process new requests for the web page, wherein "n" is number greater than zero; and
based on the receiving the communication from the host, transmitting "n" tokens to "n" of the clients at the top of the queue, the tokens identifying the clients at the top of the queue as having been released from the queue, wherein the transmitting is performed in a pull manner after and as a result of receiving another asynchronous call from the client.

16. The system of claim 15, wherein the queue data and the updated queue data are configured for providing an error page at a browser of the client.

17. The system of claim 15, wherein the queue data is stored in a cloud-based data storage device and the system is further operable to:
provide queue data from the cloud-based data storage device to the client, wherein the client is one of a plurality of remote clients in communication with the system; and
based on a failure to receive a call from the client, delete a client from the queue.

18. A computer program product comprising a computer readable hardware storage device having readable program instructions stored on the computer readable hardware storage device, the program instructions comprising:
program instructions that receive, at a host of a web page, a request for the web page from a browser of a client;
program instructions that determine a temporary inability to serve the web page to the client;
program instructions that switch from a non-token-based operating mode, which handles requests for the web page that do not include tokens, to a token-based operating mode, which only handles the requests for the web page that include tokens;
program instructions that send an error page to the client, wherein the error page includes a script that:
  causes the browser to automatically contact a service that maintains a queue associated with the web page and request inclusion in the queue; and
  causes the browser to periodically asynchronously poll the service to request updated queue data of the client, wherein the updated queue data includes an updated position in the queue and an updated estimated wait time in the queue;
program instructions that determine an availability number, wherein the availability number is a number "n" that equals a number of threads available to process new requests for the web page; and
program instructions that communicate the availability number to the service that maintains the queue,
wherein the script is embedded in the error page and, after receiving a token from the service that maintains the queue, causes the browser to automatically re-submit a request for the web page and the token to the host.

19. The computer program product of claim 18, wherein: the error page is configured to display the position and estimated wait time to the client.

20. A method implemented in a computer infrastructure comprising a combination of hardware and software, the method comprising:
submitting a request for a web page to a host;
receiving an error response from the host indicating that the web page is temporarily unavailable, wherein the host has switched from a non-token-based operating mode in which an HTTP server handles requests for the web page without tokens to a token-based operating mode in which the HTTP server only handles requests for the web page that include the tokens;
sending a request to a service to be included in a queue associated with the web page;
receiving queue data from the service;
displaying a custom error page based on the queue data;
sending an asynchronous call to get updated queue data;
receiving a token from the service, wherein:
  the token is one of "n" tokens transmitted to "n" of the clients at the top of the queue;
  the "n" tokens identify the "n" of the clients at the top of the queue as having been released from the queue;
  "n" is equal to a number of available threads at the host to process new requests for the web page; and
  the token is transmitted in a pull manner after and as a result of receiving another asynchronous call;
submitting the token with a second request for the web page to the host, wherein the host is in an alternate operating mode that only handles requests for the web page include one of the "n" tokens;
receiving the web page from the host based on the second request including the token; and
displaying the web page.

21. The method of claim 20, wherein:
the sending the request to the service is performed automatically based on the receiving the error response from the host; and
the submitting the second request for the web page to the host is performed automatically based on the receiving the token from the service.

22. A computer system for queuing clients when a web page of a host is temporarily unavailable, the system comprising:
a CPU,
computer readable storage device;
program instructions stored on the computer readable hardware storage device for execution by the CPU, the program instructions comprising:
program instructions to receive an indication from a browser of a client that the web page is temporarily unavailable;
program instructions to switch from a non-token-based operating mode in which an HTTP server handles requests for the web page without tokens to a token-based operating mode in which the HTTP server only handles requests for the web page that include the tokens;
program instructions to receive an asynchronous call from the client to get updated queue data;
program instructions to add the client to a queue with a plurality of other clients waiting for the web page;
program instructions to provide queue data to the client, wherein the queue data includes queue position, data indicating that the user should not refresh the web page, and estimated wait time for the client;
program instructions to move the client backward from their current queue position in the event that the client refreshes the web page;
program instructions to receive an indication of availability to handle new page requests from the host of the web page, wherein the indication of availability is a number "n" that is equal to a number of threads that are available to process new requests for the web page in the host;

program instructions to, based on receiving the indication of availability, transmit tokens to "n" number of the clients at the top of the queue, the tokens identifying the "n" number of the clients as having been released from the queue, wherein the transmitting is performed in a pull manner after and as a result of receiving another asynchronous call from the client; and program instructions to, based on receiving the indication of availability, delete the "n" number of the clients from the queue.

\* \* \* \* \*